United States Patent Office 3,272,118
Patented Sept. 13, 1966

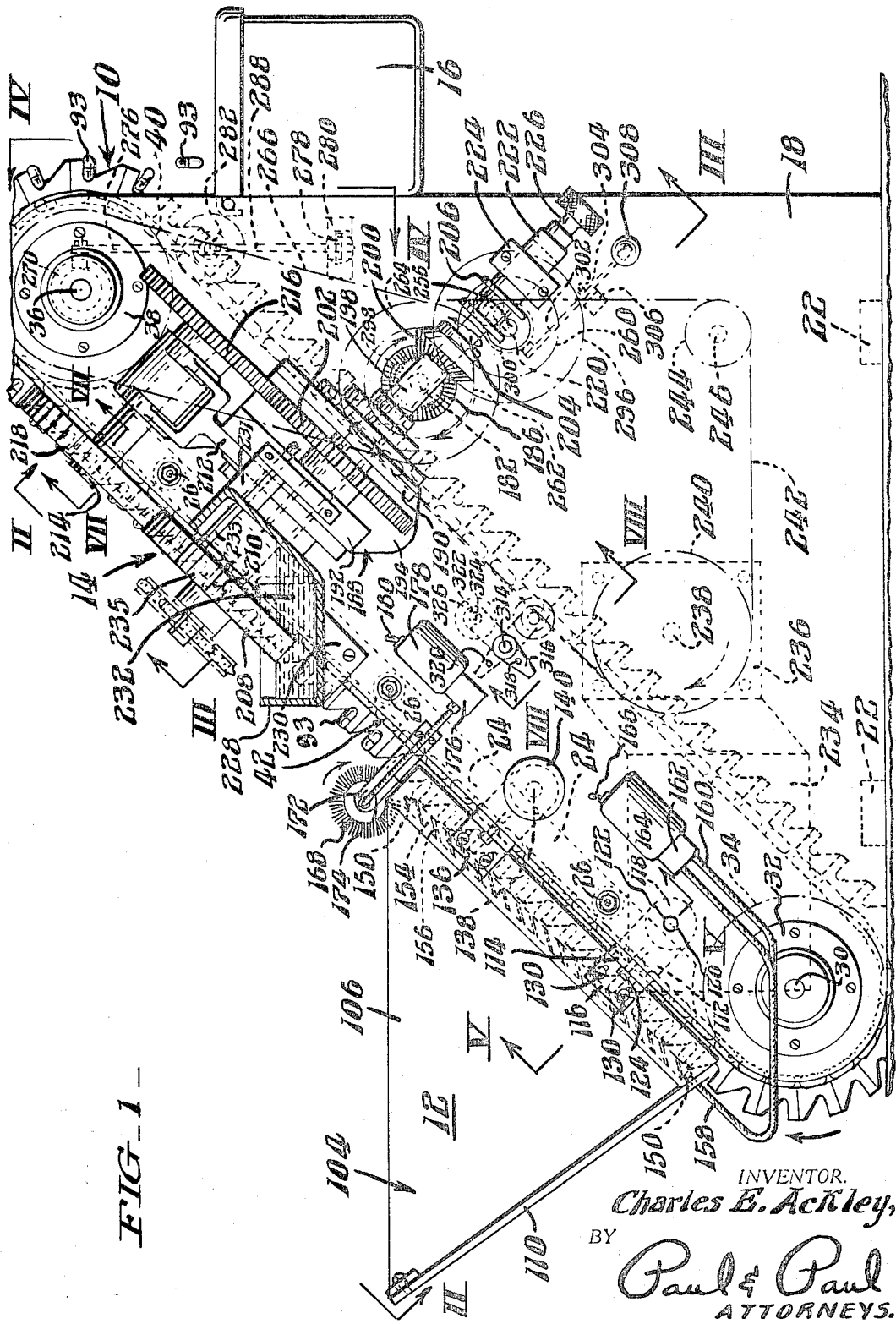

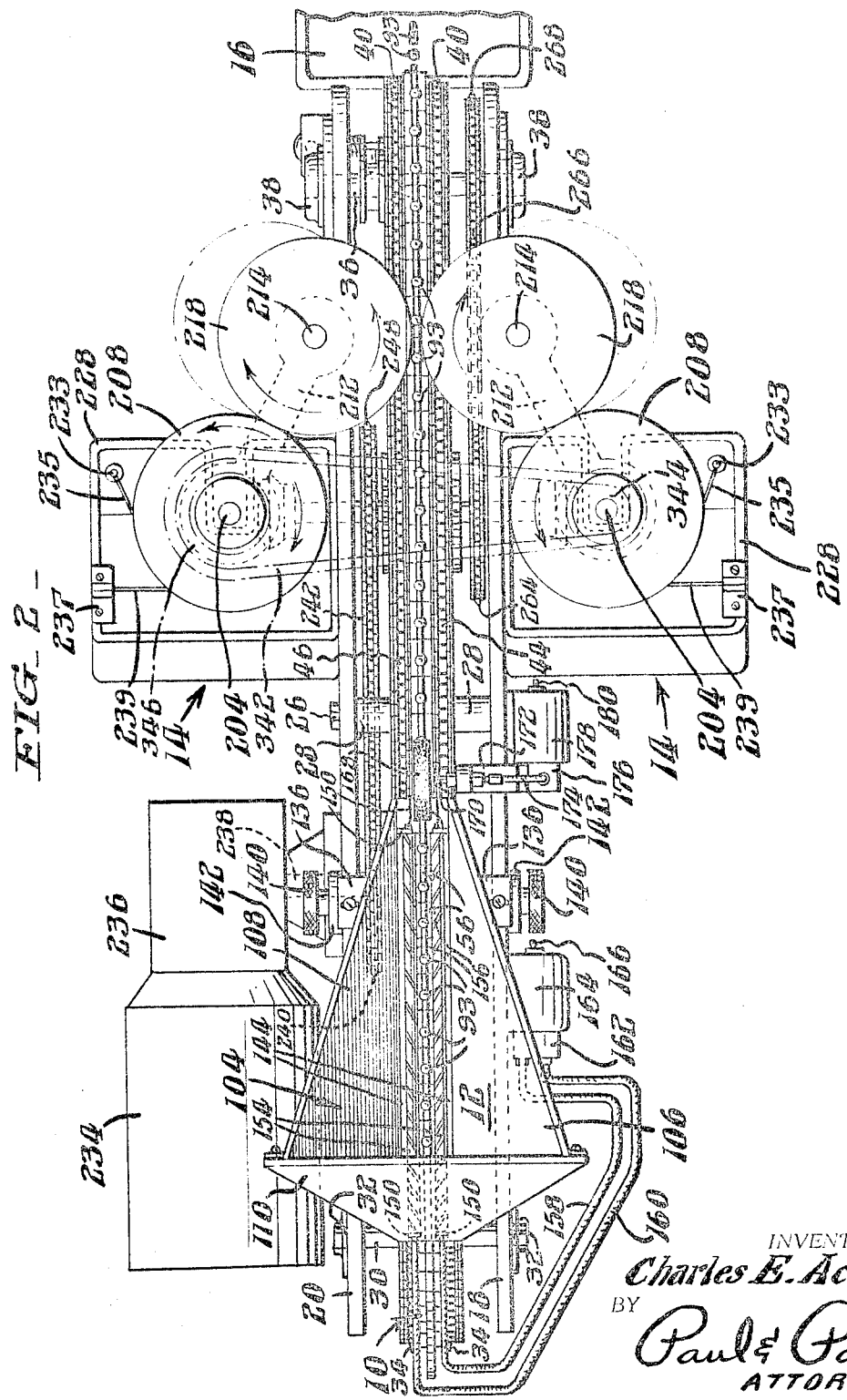

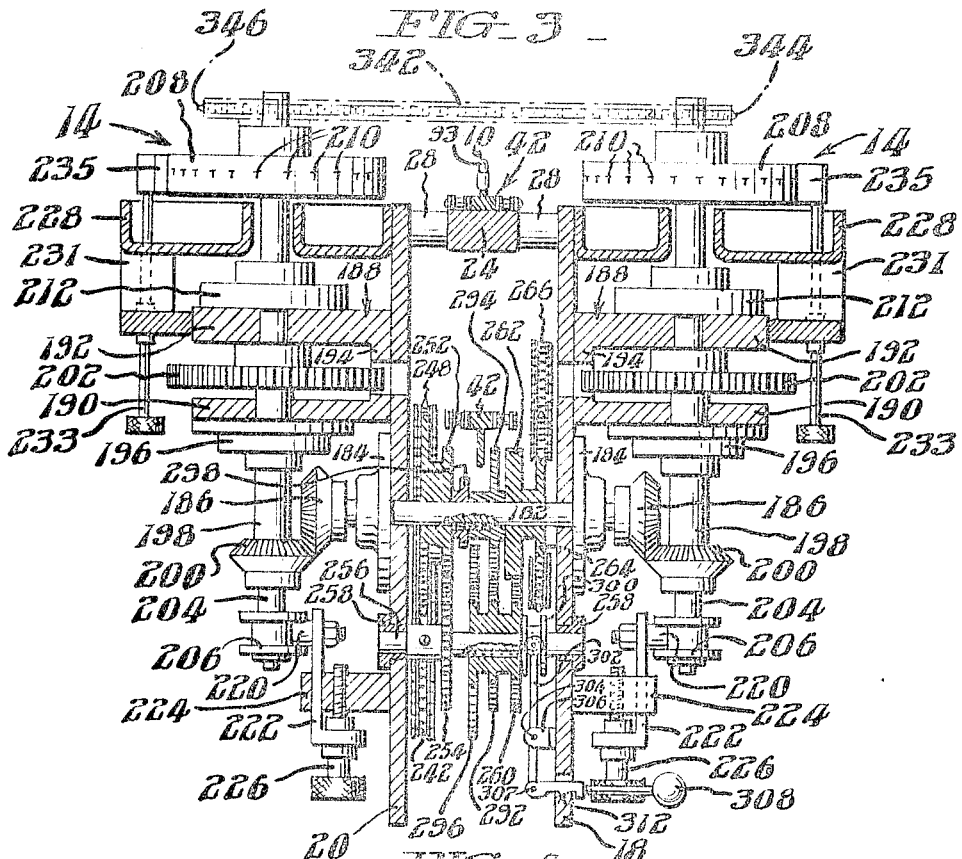
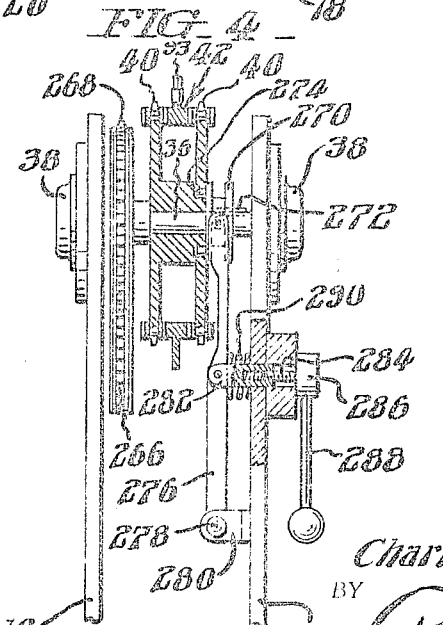

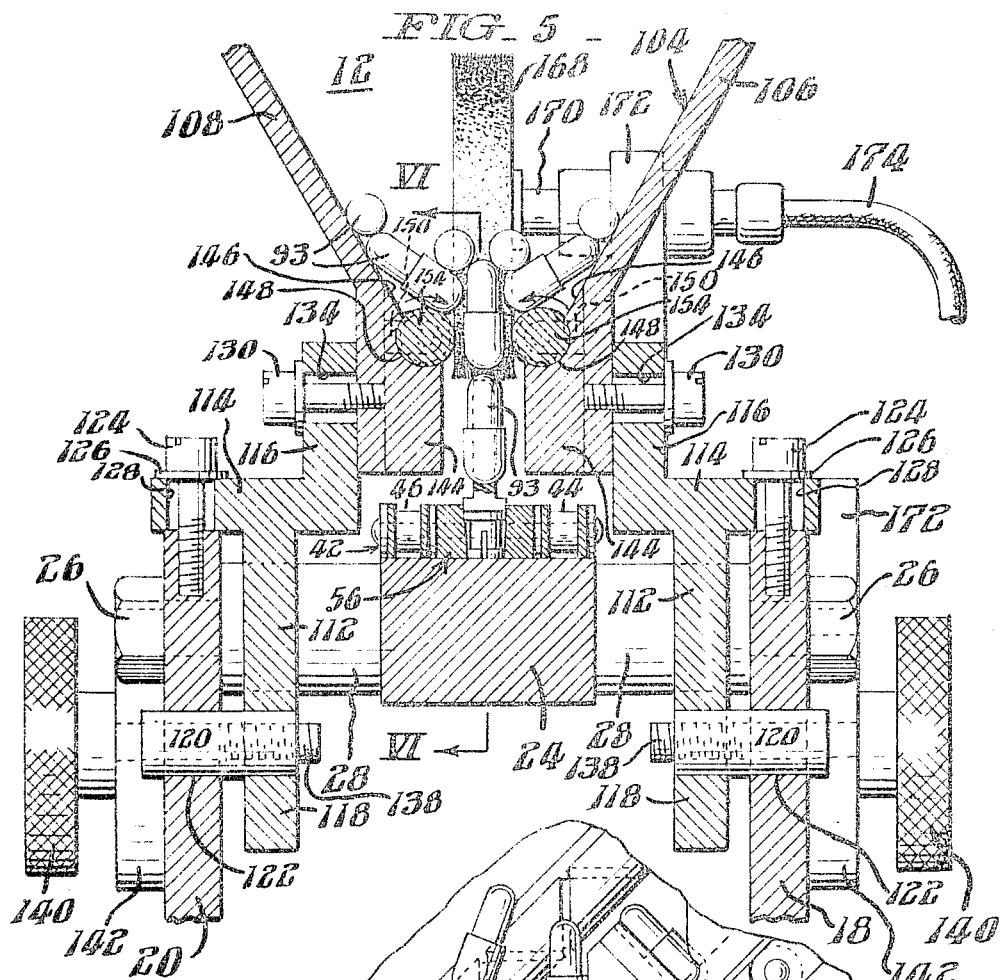

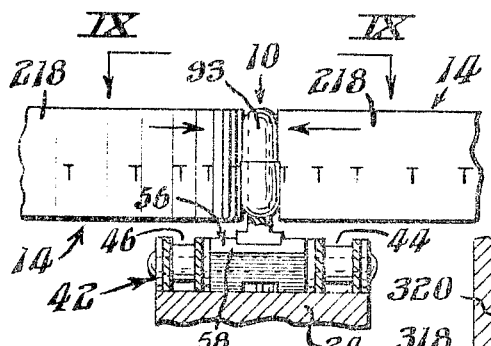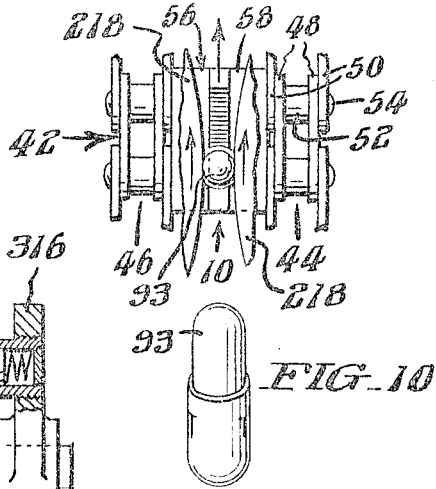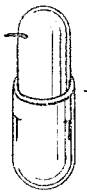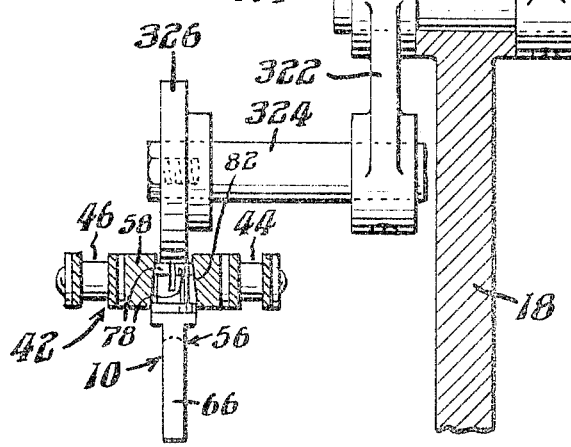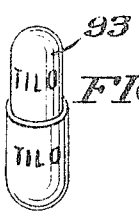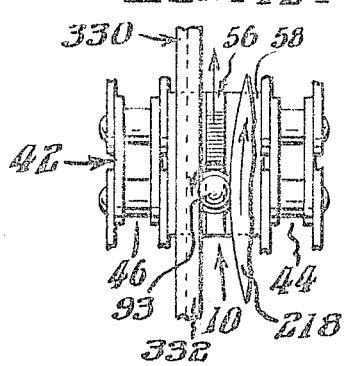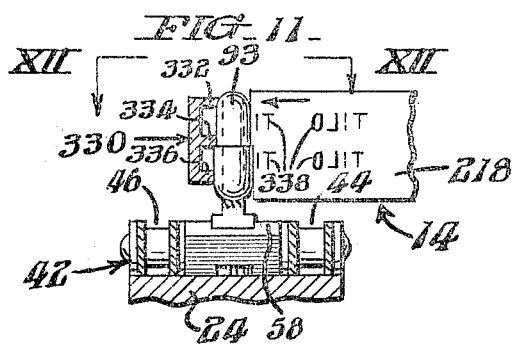

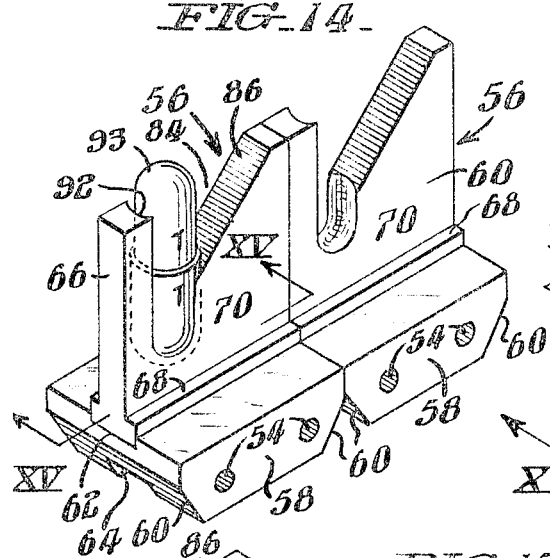
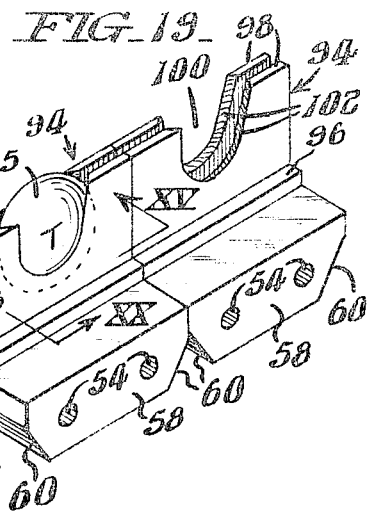
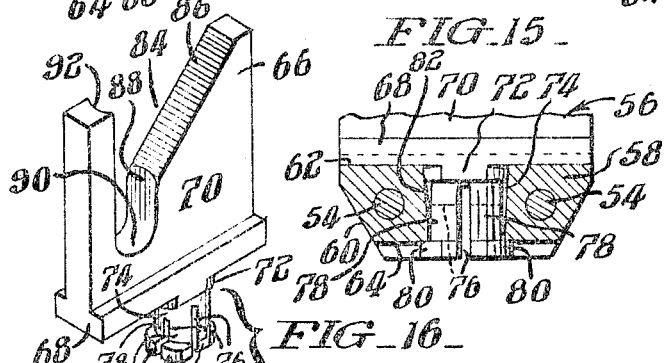
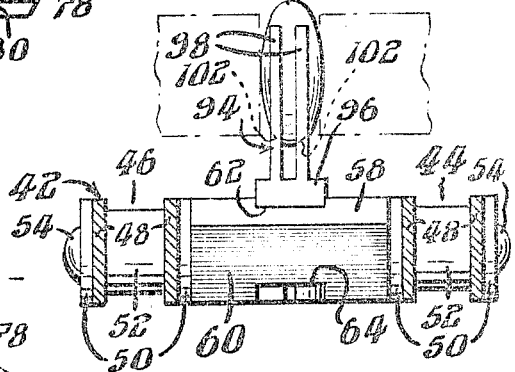
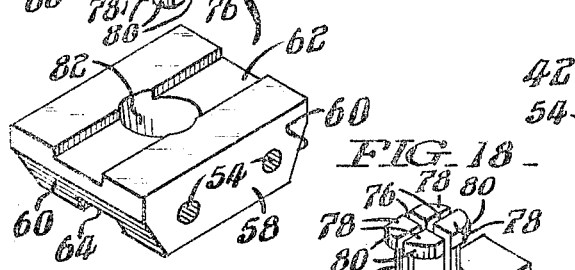
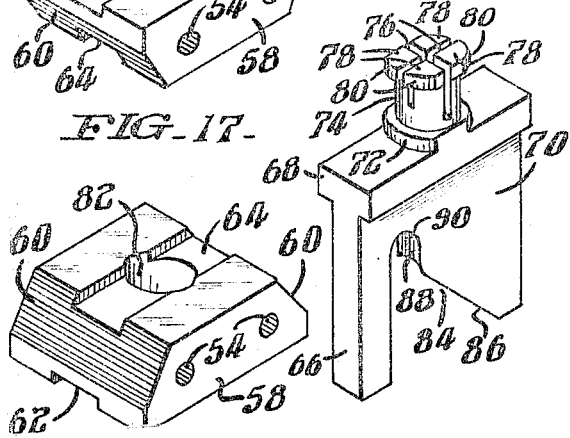
INVENTOR.
Charles E. Ackley,
BY
Paul & Paul
ATTORNEYS.

3,272,118
ARTICLE MARKING MACHINE
Charles E. Ackley, Oreland, Pa., assignor to R. W. Hartnett Company, Philadelphia, Pa., a corporation of Pennsylvania
Filed Feb. 4, 1965, Ser. No. 430,283
15 Claims. (Cl. 101—37)

This invention relates generally to marking machines, and particularly to machines for applying, on a mass production scale, fine markings or other indica to small objects, such for example as pills, tablets, capsules, pellets and the like, all of which are referred to herein generically as pellets, articles or objects.

For some time the pharmaceutical and other industries have been applying manufacter's trademarks or other indicia or inscriptions to their products. These indicia not only serve to identify the source of the product but can also be printed so finely and so distinctively directly upon the articles as to render counterfeiting difficult or virtually impossible.

The prior patent to Amos Ackley, No. 2,859,689, granted November 11, 1958, teaches a method of applying fine-lined indicia on a mass production scale to pellets of pharmaceutical or other nature. The patent also discloses a machine involving an offset printing process for accomplishing the desired end. The machine shown in the patent has met with substantial success, particularly when large quantity production is desired. However, the machine is constructed to print tablets or the like on one side only and involves a multiplicity of somewhat expensive components. Furthermore, considerable effort is required in order to change over from printing one type of object to printing another of different size or shape. In addition, the machine has no capacity to move or shift the object itself as a part of the printing operation, which has now been found to be highly desirable for some purposes.

My prior Patent No. 2,931,292, granted April 5, 1960, discloses a marking machine which is constructed to print on both sides of the articles, and the machine shown in the drawings of that patent is considerably simpler and less expensive than the one shown in the Amos Ackley Patent No. 2,859,689. However, here again there is some difficulty in changing over the equipment to accommodate articles different in size or shape.

Accordingly, an important object of my invention is to provide an novel marking machine for a multiplicity of articles all of which are essentially of the same size and shape, which machine has advantages over those disclosed and claimed in the two aforementioned patents.

Another object of my invention is to provide such a machine which is comparatively simple in construction, which is highly efficient in operation and which can be relied upon to apply to such articles sharply defined markings without distorting or otherwise damaging the articles.

Another object is to provide means whereby such a machine can be easily and quickly changed over from operation upon articles of one configuration to operation upon articles of a completely different configuration.

Another object is to provide such a machine capable of marking one side only or simultaneously marking diametrically opposite sides of the articles.

Another object is to provide such a machine capable of applying markings to selected areas circumferentially of the capsule or to one or more areas extending completely around the capsule.

Another object is to provide such a machine capable of readily accommodating oversized and undersized articles.

Another object is to provide such a machine which feeds capsules directly from a hopper to the upper run of an endless belt conveyor having upper and lower parallel runs which are inclined, and which marks the articles as they advance along the upper run toward the head of the conveyor.

Other objects of the invention will become apparent when the following description is read with reference to the accompanying drawings, wherein:

FIGURE 1 is a side elevation of the apparatus, parts being broken away to better illustrate the invention;
FIGURE 2 is a plan view of the apparatus, indicated by lines II—II in FIGURE 1;
FIGURE 3 is a section indicated by lines III—III in FIGURE 1 showing part of the drive mechanism;
FIGURE 4 is a fragmentary front view indicated by lines IV—IV in FIGURE 1 showing the clutch;
FIGURE 5 is an enlarged fragmentary section indicated by lines V—V in FIGURE 1;
FIGURE 6 is a fragmentary section indicated by lines VI—VI in FIGURE 5;
FIGURE 7 is an enlarged fragmentary section indicated by lines VII—VII in FIGURE 1;
FIGURE 8 is an enlarged fragmentary section indicated by lines VIII—VIII in FIGURE 1;
FIGURE 9 is a fragmentary plan view, indicated by lines IX—IX in FIGURE 7;
FIGURE 10 is a perspective view of a capsule marked on both sides;
FIGURE 11 is a view similar to FIGURE 7, but showing a modified arrangement;
FIGURE 12 is a fragmentary plan view, indicated by lines XII—XII in FIGURE 11;
FIGURE 13 is a perspective view of a capsule with both sections thereof marked on the same side of the capsule;
FIGURE 14 is a perspective view showing assembled capsule holders and chain blocks;
FIGURE 15 is a longitudinal section through the chain block, indicated in FIGURES 14 and 19 by lines XV—XV;
FIGURE 16 is an exploded perspective top view of a chain block and capsule carrier;
FIGURE 17 is a perspective bottom view of the chain block shown in FIGURE 16;
FIGURE 18 is a perspective bottom view of the capsule carrier shown in FIGURE 16;
FIGURE 19 is a view similar to FIGURE 14, but illustrates a carrier for pills or the like substituted for the carrier for capsules; and
FIGURE 20 is an end view of the pill carrier and chain block shown in FIGURE 19, being indicated by lines XX—XX in FIGURE 19.

The following description is directed specifically to the forms of the invention illustrated in the drawings and is not intended to be addressed to the scope of the invention.

A machine constructed in accordance with the invention includes an inclined conveyor 10 fed by suitable mechanism, generally designated 12, and mounting marking or printing mechanism, generally designated 14.

Referring particularly to FIGURES 1 through 4, the conveyor comprises a rigid framework having two laterally spaced upright side frames 18 and 20. The side frames are held apart at the base of the machine by a pair of spacers, designated 22. Disposed between inclined marginal areas of the side frames is a runner bar 24, and extending through the side frames and the runner bar 24 are a plurality of bolts 26. Fitted over each bolt 26 and disposed between each side frame and the runner 24 is a tubular spacer 28.

At the foot of the conveyor is a shaft 30 journaled in a pair of bearings 32 carried respectively by the side frames 18 and 20. The shaft 30 carries a pair of axially spaced sprockets 34. At the head of the conveyor is a shaft 36 journaled in a pair of bearings 38 carried respectively by the side frames 18 and 20. The shaft 36 carries a pair of axially spaced sprockets 40.

The conveyor comprises an endless belt, generally designated 42, including a pair of articulated chains 44 and 46 each trained over one of the sprockets 34 and one of the sprockets 40. The upper and lower runs of the endless belt are parallel and inclined at approximately 35 to 55 degrees. The upper run of the endless belt rests upon the runner bar 24, as shown. Alternate links of each chain include a pair of inner bars 48, and intervening links of each chain include a pair of outer bars 50. Between each pair of inner links are a pair of spacers 52, and extending through each spacer 52 and the associated links is a pin 54.

Associated with each corresponding pair of alternate links respectively of the chains 44 and 46 is an attachment, generally designated 56. Each attachment includes a base member 58 made of brass and beveled at both ends, as at 60, and provided at the top and bottom respectively with longitudinally extending grooves 62 and 64. The pins 54 extend through the base members 58, as shown. The base member 58 accommodates a holder member 66 made of plastic material and provided with a longitudinally extending base part 68 integral with a main body part 70 and seated in the groove 62. Depending from the base part 68 is a yieldable release member or protuberance 72 having a reduced diameter portion 74 intermediate the ends thereof and cross slits, as at 76, to provide four flexible fingers 78, each terminating in a laterally extending flange 80. The protuberance 72 projects downwardly through a tapered opening 82 formed in the base member 58 and snaps under the base of the groove 64.

Referring particularly to FIGURES 14 and 16, the member 66 is provided with an open recess or indentation forming a cradle 84 which has a downwardly and rearwardly extending feed surface 86, a vertically extending surface 88 at the front thereof, a rounded bottom 90 and a vertically extending surface 92 at the rear thereof. The surface 86 is flat, but the surface 88, bottom 90 and surface 92 are rounded, as shown, for cradling a capsule 93. When the holder is on the upper run of the endless belt, the surface 86 is upright. The diameter of the capsule is greater than the thickness of the main body 70, in consequence of which the opposite sides of the capsule extend beyond the sides of the main body 70. In addition, the arrangement is such that the capsule may turn or spin freely about its longitudinal axis.

Referring particularly to FIGURES 19 and 20, a modified form of holder member, suitable for accommodating pills and the like, is shown. The holder member, designated 94, is made of plastic material and is provided with a base part 96 secured to the brass base 58 as described hereinabove in connection with holder member 56. The main body part includes two laterally spaced sections 98. Referring particularly to FIGURE 19, the sections 98 are provided with opposed downwardly and rearwardly extending cradle forming recesses 100, the inner edges of which are beveled, as at 102 for receiving a pill 95 having a thickness greater than that of the holder member 94, in consequence of which the opposite sides of the pill extend beyond the remote sides of the sections 98 of the holder member 94. When the holder is on the upper run of the endless belt, the leading edges of the recesses 100 are upright.

Referring particularly to FIGURES 1, 2 and 5, the feed mechanism 12 comprises a hopper, generally designated 104, including inclined opposite side panels 106 and 108 and an inclined rear panel 110. The rear of the hopper is supported on a pair of brackets 112 respectively on opposite sides of the hopper. Each bracket is provided with a main body part 114 seated upon the associated side frame 18 or 20. Extending upwardly from the main body part 114 is a flange 116, and depending from the main body 114 is another flange 118. A pintle 120 extending laterally from the flange 118 is slidably projected through an opening 122 in the associated side frame 18 or 20. The main body 114 is secured to the underlying side frame by means of a stud 124 extending through a flat washer 126 and through an elongated opening 128 for being threaded into the side frame. The flange 116 is secured to the bottom of the hopper by means of a stud 130 projected through an elongated opening 134 for being threaded into the bottom of the hopper.

The front of the hopper is supported on a pair of brackets 136 respectively on opposite sides of the hopper. The brackets 136 are generally similar to the brackets 112, but in place of a pintle such as 120 there is threaded into the flange 118 a screw 138 which extends through and is axially fixed relative to a boss 142 carried by the associated side frame 18 or 20. The screw 138 is provided with a head 140.

Lining the bottom of the hopper are a pair of laterally spaced bars 144. Each bar has its longitudinally extending upper edge beveled, as at 146, and arcuately recessed, as at 148. The bars 144 carry bearings 150 in which are journaled laterally spaced parallel rollers 154 provided with right and left-hand spiral grooves 156. The pitch of the grooves is approximately twice the diameter of the rollers. Corresponding ends of the rollers are connected respectively to a pair of flexible shafts 158 and 160. The free ends of these flexible shafts are connected to a gear box 162 associated with an electric motor 164 controlled by a switch 166.

At the upper end of the hopper is a brush 168 carried by a stub shaft 170 journaled in a bracket 172. One end of the stub shaft is connected to a flexible shaft 174. The opposite end of the flexible shaft is connected to a gear box 176 associated with an electric motor 178 controlled by a switch 180.

Referring particularly to FIGURES 1-3, extending through the side frames 18 and 20 is a shaft 182 journaled in a pair of bearings 184 and carrying a pair of bevel gears 186. On each side of the conveyor the bevel gear 186 underlies a bracket 188 provided with a lower arm 190, an upper arm 192 and a base 194 secured to the associated side frame 18 or 20. Affixed to the lower arm 190 is a bearing 196 in which is journaled a tubular shaft 198 carrying at the lower end thereof a bevel gear 200 which meshes with the bevel gear 186. Mounted upon the upper end of the shaft 198 is a spur gear 202 disposed between the upper and lower arms of the bracket 188. A solid shaft 204 extends through the shaft 198, and the lower terminal portion of the shaft 204 has affixed thereto a flanged collar 206, while an upper terminal portion of the shaft has affixed thereto an ink transfer roll 208 provided with circumferentially equally spaced characters 210 etched into the face thereof.

Pivoted on the shaft 204 is one end of a swing arm 212. The opposite end of the swing arm mounts a shaft 214, the lower end portion of which carries a gear 216 which meshes with the gear 202. The upper end of the shaft 214 mounts an offset print roll 218 with a face of rubber or other suitable material which engages the face of the transfer roll 208.

Between the flanges of the collar 206 is a roller 220 mounted upon a slide 222 carried by a bracket 224 affixed to the side frame 18 or 20, and extending through the lower portion of the slide 222 is a screw 226 threaded into the bracket 224.

Associated with the transfer roll 208 is an ink pot 228 having a depending flange 230 by means of which it is affixed to the side frame. Affixed to the upper arm 192 of the bracket 188 is an auxiliary bracket 231 mounting a shaft 233 which extends through the ink pot 228 and mounts at the upper end thereof a doctor blade 235 adapted for engagement with the face of the transfer roll 208. Also secured to the ink pot, as by a bracket 237, is a doctor blade 239 also adapted for engagement with the face of the transfer roll 208.

The transfer rolls 208 are of the same diameter as the offset printing rolls 218 and in practice have etched into or otherwise formed on their faces at circumferential intervals corresponding to the spacing of the attachments 56 of the conveyor, the indicia, characters or inscriptions with which the articles are to be marked.

Referring particularly to FIGURES 1 through 4, an electric motor, designated 234, actuates a speed reducer 236, the output shaft 238 of which mounts a sprocket 240. Trained about the sprocket 240 is a chain 242 which is also trained about a sprocket 244 carried by a shaft 246. The chain 242 actuates a sprocket 248 and a gear 252 formed integral with the sprocket 248. The sprocket 248 and the gear 252 are carried by the shaft 182 and turn freely thereabout. The gear 252 meshes with a gear 254 affixed to a shaft 256 having opposite end portions journaled in a pair of bearings 258. Through a gear 260 the shaft 256 actuates a spur gear 262 integrally formed with a sprocket 264 about which is trained a chain 266. The chain 266 is also trained about a sprocket 268 affixed to the head shaft 36 of the conveyor. Splined to the head shaft 36 is a flanged clutch collar 270, the spline being designated 272. The collar carries a plurality of pins 274 engaged with the head sprockets 40, which are freely rotatable about the head shaft. The upper end of a clutch lever 276 is engaged with the collar 270, and the lower end of the lever is pivoted, as at 278, to a bracket 280 extending from the side frame 20. Connected to an intermediate portion of the lever is a link 282 extending through the side frame and having a stud 284 threaded into the end thereof. Interposed between the lever and the side frame is a compression spring 290. The head of the stud 284, designated 286, is provided with a handle 288.

Formed integral with the gear 260 is a gear 292 which meshes with a gear 294 affixed to the shaft 182. Also formed integral with the gear 260 is a gear 296 which is not in mesh with any gear, but which is adapted to mesh with a gear 298 carried by the shaft 182. The gears 260, 292 and 296 are splined to the shaft 256, and for shifting the same longitudinally of the shaft a flanged gear shift collar 300 is provided. The upper end of a gear shift lever 302 is engaged with the collar and an intermediate portion is pivoted, as at 304, to a bracket 306. The lower end of the lever is connected, as at 307, to a link or handle 308 which extends freely through the side frame 18 and is provided with detents 312 for holding the handle in a selected position.

Referring particularly to FIGURES 1 and 8, extending through the side frame 18 is a stub shaft 314 which mounts on one end thereof a lever 316 carrying a spring-pressed detent 318 engaged in a depression 320. The other end of the shaft 314 carries an arm 322, the free end of which mounts a stub shaft 324 mounting a roller 326 directly over the lower run of the endless belt 42.

In the operation of the machine, the motor 234 is energized. This operates the reducer 236 and the output shaft 238 thereof turns the sprocket 240 and actuates the chain 242. Thus the sprocket 248 and gear 252 are turned about the shaft 182. Gear 252 turns gear 254, shaft 256 and gear 260. Gear 260, through gear 262 and sprocket 264, actuates the chain 266. Thus the sprocket 268, head shaft 36 and the collar 270 are actuated. Through the collar 270 the head sprockets 40 are actuated. This actuates the endless belt 42 which, being trained over the foot sprockets 34, actuates the latter.

Switch 166 is closed, whereupon the flexible shafts 158 and 160 are actuated. Thus the rollers 154 are turned in opposite directions, as indicated by the arrows in FIGURE 5. In addition, the switch 180 is closed. Thus the flexible shaft 174 turns the shaft 170 and actuates the brush 168. Now the capsules which are to be marked are dumped into the hopper 104. Referring particularly to FIGURES 5 and 6, the rollers 154 and the brush 168 coact to urge the capsules into the recesses 84 of the capsule holders 66, the final cradled position of a capsule in a holder 66 being best shown in FIGURES 6 and 14. The capsules which do not lodge in the recesses 84 are prevented from spilling out of the front end of the hopper by the brush 168. Thus, capsules are carried along the upper run to the head of the conveyor and over and around the head sprockets. As a holder turns about the head sprockets to enter the lower run of the conveyor, the capsule is gravity discharged into the hopper 16.

It will be noted that if the elements fastening the sides 106 and 108 of the hopper 12 to the back 110 thereof are loosened, and if the studs 124 securing the brackets 112 and 136 to the side frames 18 and 20 are loosened, the sides of the hopper 12 may be shifted laterally to suitably locate the rollers 154 relative to the endless belt 42. In addition, if the studs 130 securing the hopper sides to the brackets 112 and 136 are loosened, either side of the hopper may be raised or lowered to suitably locate the rollers 152 and 154 relative to the endless belt 42.

The drive to the endless belt 42 may be interrupted at any time by turning the handle 288 in a direction to withdraw the pins 274 from the sprockets 40 against the influence of spring 290, as will be readily understood.

The gears 260, 292 and 296 being splined to the shaft 256 may be shifted longitudinally thereof by manipulating the gear shift handle 308, as will be understood. When the handle is operated, gear 260 remains constantly engaged with gear 262, as shown. However, gears 292 and 294 disengage and gears 296 and 298 engage. Thus the surface speed of the printing rolls may be increased without increasing the linear speed of the conveyor.

On each side of the machine, the gear 186 actuates the gear 200, tubular shaft 198 and gear 202. The tubular shaft 198 turns in bearing 196. Gear 202 actuates gear 216 and, through the latter gear, shaft 214 and the printing roll 218. The peripheral speed of the printing roll 218 is equal to the linear speed of the conveyor. The face of the printing roll 218 being in frictional contact with the face of the transfer roll 208 turns the latter and shaft 204 in the tubular shaft 198. The lowermost side of the transfer roll 208 dips into the printing fluid 232, and as the inked rim portion rises from the ink pot the doctor blades 235 and 239 wipe the face of the transfer roll clean, except for the ink which is retained in the depressions 210, which ink is transferred to and marks the printing roll 218. The location of these marks across the face of the printing roll may be varied by manipulating the screw 226 to raise or lower the transfer roll.

Assuming that the capsules are to be marked on both sides, for example with the letter "T," as shown in FIGURE 10, the swing arms 212 are pivoted about the shafts 204 to move the print rolls 218 from the broken line positions to the full line positions shown in FIGURE 2, where the printing rolls 218 are positioned for engaging the capsules as they pass between the rolls. The arrangement is such that the markings applied to the printing rolls by the transfer rolls register with the opposite sides of the capsules protruding laterally beyond the sides of the holders as they progress to the head of the conveyor. Thus both sides of the capsules are marked simultaneously, as shown in FIGURES 7, 9 and 10. The printing rolls being made of resilient material yield somewhat to prevent distortion of the capsules. As the capsules round the head of the conveyor, they are discharged by gravity into a container 16.

When the markings to be applied to the capsules are substantial in length circumferentially of the capsules one of the printing rolls is moved out of its operative position and a back-up bar 330 is positioned, as in FIGURES 11 and 12, so that all three flanges 332, 334 and 336 thereof will engage the capsules as they pass the printing station. In addition, the gears are shifted to increase the surface speed of the operative printing roll relative to the linear speed of the endless belt 42. Of course, the face of the operative transfer roll must be etched for suitably marking the printing roll, as for example, at 338 in FIGURE 11. Since the linear speed of the endless belt 42 remains the same, but the surface speed of the printing roll increases, fewer etchings are required on the face of the transfer roll. Each capsule registers with a portion of the printing roll which has been marked by the transfer roll and is turned or spun thereby about its longitudinal axis, being rolled along the bar 330 and over the surface of the printing roll, as shown by arrows in FIGURE 12. Thus the marking on the printing roll is impressed upon the capsule. In this way, if desired, it is possible to impress upon the capsule a mark which extends all around it.

Alternatively, when the markings to be applied to the capsules are substantial in length circumferentially of the capsules, a chain 342 is trained over a small diameter sprocket 344 and a comparatively large diameter sprocket 346 respectively on the upper terminal portions of the shafts 204. The gear 216 on the left of the machine (as viewed in FIGURE 3) is removed. Then the gears are shifted for the higher operating speed of the printing rolls 218. The drive is as described hereinbefore to the transfer roll 208 on the right, then through the chain 342 to the shaft 204 on the left. The transfer roll 208 on the left actuates the printing roll 218 on the left. The gear 200, shaft 198 and gear 202 on the left idle. Preferably, the arrangement is such that the surface speed of the printing roll 218 on the left is one-half that of the printing roll 218 on the right. The direction of rotation of the printing roll 218 on the left is as shown by the broken arrow in FIGURE 2. The printing rolls 218 coact to spin the capsule about its longitudinal axis as it is carried through the printing station. Either or both printing rolls 218 may print. If both print, the printing may be different in color, if desired. Thus the printing may extend all around the capsule; it may be applied to selected areas circumferentially of the capsule; it may be applied to longitudinally spaced areas of the capsules; it may be different in color.

When the marking to be applied to the capsules is to extend only a short distance about the capsules, and it is to be applied to only one side of the capsules, one of the ink pots may be removed or emptied and the printing roll associated therewith used solely as a back-up roll.

A change-over from marking capsules of one size to marking capsules of another size or from marking capsules to marking other articles is effected by turning lever 316 from the full line to the broken line position of FIGURE 1, whereupon the rim of roller 326 registers with the grooves 64 in the bottom of the base members 58 and engages the protuberances 72 as they pass thereunder. Thus pressure is applied axially to the end of each protuberance 72 sufficient to cause the fingers 78 thereof to flex and the protuberance to contract in transverse section. Thereupon the lateral projections 80 move inwardly toward each other and are pushed into the tapered opening 82. Thus the holder member 66 is forced part way out of the groove 62 in the top of the base member 58, making it easy to remove the same and substitute a suitable holder member. If desired, the shoulders of the lateral projections 80 may be slightly beveled (not shown) to facilitate movement of the lateral projections inwardly.

What is claimed is:

1. In an apparatus for printing a plurality of individual objects which are similar in size and shape, the combination which comprises means forming an endless conveyor having an upper run which is upwardly inclined in the direction of its movement, drive means connected to drive said conveyor upper run upwardly, means forming a hopper for said objects surrounding a lower portion of said upper run, carrier means on said upper run arranged to pass through said hopper to seat and to carry said objects angularly upwardly on said conveyor, offset printing means arranged alongside said conveyor including an angularly arranged transfer roll rotatably disposed in an ink reservoir, the axis of rotation of said transfer roll being substantially perpendicular to the path of said upper run and therefore at an angle to the vertical, a printing roll arranged to rotate in contact with said transfer roll and with said objects, in a position to print upon said objects while seated, and means for discharging the printed objects from said conveyor.

2. In an apparatus for printing a plurality of individual objects which are similar in size and shape, the combination which comprises means forming an endless conveyor having an upper run which is upwardly inclined in the direction of its movement, drive means connected to drive said conveyor upper run upwardly, means forming a hopper for said objects surrounding a lower portion of said upper run, carrier means on said upper run arranged to pass through said hopper to seat and to carry said objects upwardly on said conveyor, opposed rotary feed members disposed along the bottom of said hopper extending along the path of said carrier means, means causing said rotary feed members to turn toward one another in a manner to urge objects in said hopper toward said carriers in said hopper, to urge said objects to seat in said carrier means, printing means arranged alongside said conveyor in a position to print upon said seated objects, and means for discharging the printed objects from said conveyor.

3. The apparatus defined in claim 2, wherein brush means is provided above the path of movement of said carriers, and means are provided for rotating said brush means in opposition to the movement of said carriers, thus cooperating with said rotary feed members to urge said objects to seat in said carrier means.

4. In apparatus for printing objects similar in size and shape, the combination comprising a conveyor for carrying said objects in single file from the foot thereof upwardly along an inclined path to the head thereof, means over the foot of said conveyor providing a hopper having a discharge opening in the bottom thereof directly over said conveyor and through which said objects are fed to said conveyor, a pair of laterally spaced revolvable members at the bottom of said hopper means respectively on opposite sides of said underlying conveyor, carrier means on said conveyor arranged to receive objects discharged through said opening, said members being operable for urging said objects to pass between said members and through said opening to said carrier means, and for urging said objects to seat in said carrier means for being carried thereby upwardly away from said hopper means, and printing means operable for printing said objects as they are carried away from said hopper means.

5. The combination defined in claim 4, wherein the revolvable members are in the form of elongated rollers, and said rollers and the discharge opening in the bottom of the hopper means extend together along the path of the conveyor.

6. The combination defined in claim 5, wherein one of said rollers is provided with a right-hand spiral groove, the other is provided with a left-hand spiral groove, the pitch of said spiral grooves is approximately twice the diameter of the rollers, and said rollers are turned in opposite directions.

7. In apparatus for printing objects similar in size and shape, the combination comprising a conveyor for carrying said objects in single file from the foot thereof upwardly along an inclined path to the head thereof, means over the foot of said conveyor providing a hopper having a discharge opening in the bottom thereof directly over said conveyor and through which said objects are fed to said conveyor, a pair of laterally spaced elongated rollers at the bottom of said hopper means respectively on opposite sides of and extending along said underlying conveyor, a brush at the corresponding upper ends of said rollers mounted over said conveyor for rotation about a horizontal axis, carrier means on said conveyor arranged to receive objects discharged through said opening, said rollers and brush being adapted for coaction to urge said objects to pass between said rollers and through said opening to said carrier means, and for urging said objects to seat in said carrier means for being carried thereby upwardly away from said hopper means, and printing means operable for printing said objects as they are carried away from said hopper means.

8. The combination defined in claim 5, wherein the rollers are carried by the hopper means, and the hopper and rollers are mounted over the foot of the conveyor for being shifted as a unit laterally of the conveyor and for being raised and lowered relative to the conveyor.

9. The combination defined in claim 8, wherein the hopper means is provided with a back and opposite sides respectively carrying the rollers, the back and opposite sides being adjustably secured together, and each side being laterally shiftable relative to the conveyor independently of the other.

10. In an apparatus for printing a plurality of individual objects which are similar in size and shape, the combination which comprises means forming an endless conveyor having an upper run which is upwardly inclined in the direction of its movement, drive means connected to drive said conveyor upper run upwardly, means forming a hopper for said objects, carrier means on said upper run arranged to receive objects from said hopper and to carry said objects upwardly on said conveyor, rotary feed members extending along the path of said carrier means, means causing said rotary feed members to turn toward one another in a manner to urge objects from said hopper toward said carriers whereby to seat therein, printing means arranged alongside said conveyor in a position to print upon said seated objects, and means for discharging the printed objects from said conveyor.

11. In an apparatus for printing a plurality of individual objects which are similar in size and shape, the combination which comprises means forming an endless conveyor having an upper run which is upwardly inclined in the direction of its movement, drive means connected to drive said conveyor upper run upwardly, means forming a hopper for said objects, carrier means on said upper run arranged to receive objects from said hopper and to carry said objects upwardly on said conveyor, offset printing means arranged alongside said conveyor including a rotatable transfer roll arranged for picking up ink from an ink reservoir, the axis of rotation of said transfer roll being substantially perpendicular to the path of said upper run and therefore at an angle to the vertical, a printing roll arranged to rotate in contact with said transfer roll and with said objects, in a position to print upon said objects while they are being carried upwardly on said conveyor, and means for discharging the printed objects from said conveyor.

12. In apparatus for printing objects similar in size and shape, the combination comprising a conveyor for carrying said objects in single file from the foot thereof upwardly along an inclined path to the head thereof, means over the foot of said conveyor providing a hopper having a discharge opening in the bottom thereof directly over said conveyor and through which said objects are fed to said conveyor, carrier means on said conveyor arranged to receive objects discharged through said opening, means operable for printing said objects as they are advanced by and carried away from said hopper means by said conveyor including a bar member stationarily mounted and extending along one side of said conveyor proximate said carrier means, and a print roll disposed on the opposite side of said conveyor for printing objects seated in said carriers, said bar being operative for backing up said objects while they are being printed, and means for operating said printing roll at a surface speed in excess of the linear speed of said conveyor thereby to rotate each of said objects as it is being printed.

13. The combination comprising means providing an endless conveyor having upper object carrying and lower return runs, a series of base members secured to said conveyor, a series of carrier means releasably secured respectively to said base members, an elongated element contractable in transverse section depending from each carrier means and extending through the associated base member, the lower extremity of said element being disposed below the undersurface of said base member and being interlocked therewith, a roller disposed over said return run and revolvable about a horizontal axis, said roller being positionable for engaging the extremities of said elements as they pass thereunder and applying pressure thereto for contracting the same and releasing each from the associated base member to facilitate detachment therefrom.

14. Carrier means for an object to be printed, comprising a base member, means for attaching said base member to a conveyor, said base member having a longitudinally extending shallow recess and also having an aperture extending therethrough at right angles to said recess, a carrier member having a bottom portion constructed to fit into said recess, object engaging means on said carrier member constructed to receive and retain said object to be printed, said carrier having a protuberance depending from the bottom thereof and slotted to form relatively yieldable fingers, said protuberance thereby being provided with capacity for expansion and contraction for interlocking with said base by snap engagement therewith.

15. The apparatus defined in claim 14, wherein the upper marginal area of the carrier member is recessed intermediate the opposite ends thereof to form a pair of spaced apart upstanding sections, and each of said sections is divided into a pair of opposed relatively thin walls by a slot extending longitudinally of said carrier member, said recess being of a shape to receive an object to be printed and said walls being slightly yieldable sidewardly to accommodate a slightly oversize object to be printed.

References Cited by the Examiner

UNITED STATES PATENTS

| | | | |
|---|---|---|---|
| 651,329 | 6/1900 | Hagen | 101—40 |
| 774,822 | 11/1904 | Biette | 101—38 |
| 1,536,184 | 5/1925 | Ahlburg | 101—37 |
| 1,992,347 | 2/1935 | Bartlett | 101—37 |
| 2,267,661 | 12/1941 | Meyers | 101—111 |
| 2,785,786 | 3/1957 | Bartlett | 198—33 |
| 2,931,292 | 4/1960 | Ackley | 101—37 |

ROBERT E. PULFREY, *Primary Examiner.*

WILLIAM McCARTHY, *Assistant Examiner.*